May 28, 1957 R. B. STELZER ET AL 2,793,805
CONDUCTIVE BARRIERS
Filed March 3, 1951
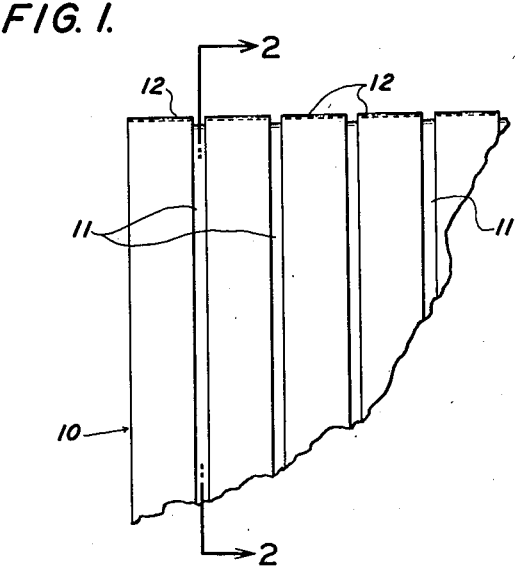
FIG. 1.
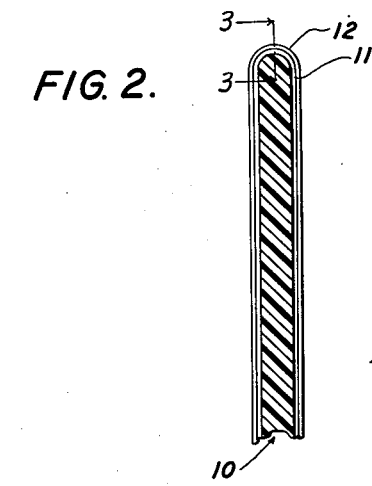
FIG. 2.
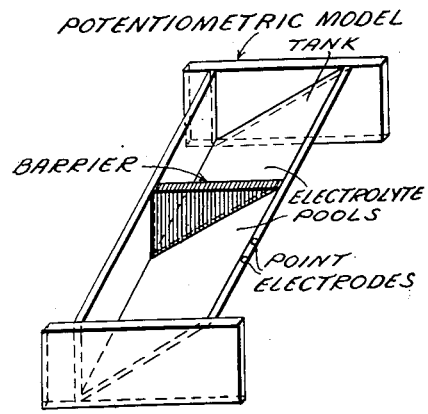
FIG. 3.
FIG. 4.
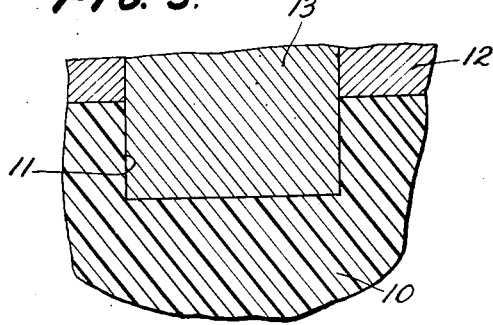
INVENTORS.
ROLAND B. STELZER
GERHARD HERZOG
BY
Daniel Stryker
ATTORNEY United States Patent Office 2,793,805
Patented May 28, 1957

2,793,805

CONDUCTIVE BARRIERS

Roland B. Stelzer, Bellaire, and Gerhard Herzog, Houston, Tex., assignors to The Texas Company, New York, N. Y., a corporation of Delaware Application March 3, 1951, Serial No. 213,736

3 Claims. (Cl. 235—61)

This invention relates to conductive barriers and particularly to conductive barriers employed in potentiometric models and other electrical analogue apparatus. Such models and apparatus are used for the solution of problems arising in the investigation of electrical, magnetic, mechanical, hydraulic and thermal systems. The invention provides novel forms of conductive barriers as well as methods for making them and aims to avoid serious distortion of current flow lines and equipotential lines in the neighborhood of barriers disposed between bodies of electrolyte.

Although the conductive barriers of the invention have general application, they are particularly suitable for use in potentiometric models of the type described and claimed by Burton D. Lee and Gerhard Herzog in co-pending application Serial No. 93,388, filed May 14, 1949 (now U. S. Patent No. 2,547,950, granted April 10, 1951).

As disclosed in co-pending applications Serial No. 788,989, filed December 1, 1947, by Burton D. Lee, Serial No. 791,797, filed December 15, 1947, by Alexander Wolf, and Serial No. 674,904, filed June 6, 1946, by Wolf and Lee, a number of mechanical, magnetic, electrical and thermal systems obey Laplace's equation, at least approximately. By way of example, there is a complete analogy between the flow of an uncompressed fluid in a porous medium and the flow of electricity in a conductor. This analogy has been applied to the solution of oil and gas field problems through the construction of an electrical analogue which employs a conductive model, say a pool of electrolyte the shape of which is analogous to that of the petroleum producing structure undergoing investigation. Wells in the structure are represented by electrodes projecting into the pool. In the case of a gas condensate field being subjected to a cycling operation, some of the electrodes may represent injection wells and others extraction wells. Exploration of the potential gradients set up in the pool by the electrodes permits accurate mapping of the "invasion front" of the dry gas being pumped into the injection wells to displace wet gas removed through the extraction wells.

Similar analogies may be drawn between the flow of electricity and the conduction of heat in solid thermal conductors, the distribution of mechanical stresses in loaded structures, and the distribution of flux in electrical, magnetic and electromagnetic fields. The electrical model or analogue technique is applicable to solution of problems arising in all of the foregoing cases, examples being the design of hydraulic structures such as dams and the design of electrical apparatus including condensers, insulators, conductive terminals and electrical discharge devices such as vacuum tubes, radiation counters, electrostatic lenses, etc.

Electrical logging technique is employed in oil and gas fields to investigate the nature and thickness of the various earth formations penetrated by wells. Currents are set up in the mud or liquid in the well bore and thereby in the formations and the effects of these currents are measured with one or more exploring electrodes which are drawn through the bore, observed potentials being plotted against well depth. Both "self potential" and "resistivity" logs are obtained and yield valuable information with respect to sub-surface geology.

The earth formations penetrated by a deep well usually consist of a multitude of layers of various thicknesses and resistances and with various self potentials. The interpretation of "self potential" and "resistivity" logs obtained in such wells has, thus far, depended upon a number of theoretical considerations which cannot be verified in actual wells because of the large number of unknowns involved. A technique has been developed whereby various theories and hypotheses employed in well logging interpretation may be subjected to check. This is disclosed in detail in the aforementioned co-pending application Serial No. 93,388, filed May 14, 1949 (now U. S. Patent 2,547,950). The technique employs an electrical analogue or potentiometric model of a well bore and its surrounding earth formation or formations. In this model there is an elongated trough or basin, preferably of wedge shaped cross section with a bottom which slopes down toward one side. A longitudinal impervious barrier divides the trough into two adjacent compartments, one narrow and preferably shallow, the other wide and preferably deep. Means are provided for transmitting electrical current across the barrier at a plurality of points throughout its length, but not longitudinally thereof. In other words, no equipotential surface is necessarily established at the barrier. Pools of electrolyte are disposed in the two compartments with the narrow compartment representing the well bore and the wide compartment representing the earth penetrated by the bore.

To simulate a series of earth formations penetrated by the bore the wide compartment may be subdivided by partitions disposed transverse to the longitudinal barrier which represents the wall of the well bore. Each of these partitions, like the longitudinal barriers, should be provided with means for conducting electricity across it substantially throughout its length, but not longitudinally. Each of the several compartments contains a pool of electrolyte, say a solution of copper sulphate. The resistivity of each of these solutions is adjusted to simulate the resistivity of the body it represents, say the mud in the bore or one of the formations or beds penetrated by the bore.

The impervious electrically conducting barriers employed in the above described model to separate pools of electrolyte may take various forms. One of the simplest is a wall of insulating material provided with U-shaped electrical conductors hung over the top of the wall out of contact with each other and projecting into the pools of electrolyte on each side. Each conductor carries some current and does establish an equipotential line between the pools, but because the conductors are out of contact with each other they do not establish an equipotential surface, which would also be established if the wall or barrier were a conductor throughout.

We have found that in order to avoid serious distortion of current flow lines and equipotential lines in the neighborhood of the barrier in a potentiometric model, say one of the type described above, the conductive areas of the barrier surface in contact with electrolyte should be quite large compared to the area of the insulating space between conductors. Thus we have found that the areas of the wall covered by the conductors should be several times (and preferably at least five times) the area of the insulating spaces between conductors on the wall surface. This matter will be understood more thoroughly through reference to Figs. 1, 2 and 3, which illustrate a preferred form of the barrier of the invention as well as the method for making such barrier. Fig. 1 is a front view of a barrier in which conductive U-shaped strips are relatively wide as compared to the insulating gaps between them, Fig. 2 being an end view, partly in section, of the barrier of Fig. 1 and Fig. 3 being an enlarged view taken on line 3—3 of Fig. 2. Fig. 4 is a perspective view showing a barrier of the invention in place in a potentiometric model of the type described in the aforementioned Patent No. 2,547,950.

The barrier of Figs. 1 and 2 was made by coating a sheet 10 of methyl methacrylate plastic of insulating character with conductive silver paint to form a continuous coating on both of its faces and the top edge. After the paint was dry, fine lines or grooves 11 were milled parallel to each other up and down on both faces and across the top edge, thus scraping off the paint and leaving between the grooves narrow parallel conductive strips 12 of the silver paint. Each strip extends on the two faces and across the top edge.

The insulating cuts or grooves should be narrow, although as a practical matter, they should not be less than .005 inch in width and grooves as wide as .01 inch have proved quite satisfactory. As indicated at the outset, the conductive strips should be several times (say from five to thirty-two times) as wide as the grooves or gaps. Three successful examples of barriers produced as described above had the following dimensions:

| Width of Insulating Groove, inches | Width of Conductive Strip, inches |
| --- | --- |
| .003 | 1/16 |
| .01 | .05 |
| .005 | .03 |

The paint employed to form the conductive strips should be of a non-tarnishing character, for oxide films formed on the strips tend to increase resistance and voltage drop across the barrier. Conductive coatings made from noble metals, for example, silver, gold or platinum, are particularly useful because of their resistance to tarnish.

The conductive strips need not be straight. Thus the gaps between strips may be milled out as curved lines around a center point.

In potentiometric models provided with barriers such as that illustrated in Figs. 1 and 2, both current flow lines and equipotential lines fall into truer positions and tortuosity in the neighborhood of the barrier is much reduced.

The barriers of the invention may be employed in a variety of potentiometric models, for example, to represent the interface between different strata in a well model, or in a potentiometric model of a wet gas field being subjected to repressurizing with recovered dry gas. Likewise, the barriers may be employed in potentiometric models to represent the boundary between materials of different magnetic permeabilities in a magnetic circuit, to represent the boundary between two materials of different dielectric character in a composite insulator and to represent the boundary between two materials having different thermal conductivities in a potentiometric model of a heat transfer system.

It has been discovered that the fine grooves between conductive strips on the barriers of the invention tend to act as capillary channels for electrolyte. The upward "creep" of the electrolytes, however, can be prevented by smearing the barriers above the liquid level with an insulating grease 13 shown only in Fig. 3. The term "insulating grease" as used herein means a hydrophobic material which will prevent capillary "creep" of electrolytes in the grooves. By way of example, vaseline (petroleum jelly) has been found to be satisfactory.

The conductive strips, may, of course, be placed on the insulating sheet in any convenient way, say for example, by electroplating. However, the use of a conductive paint, say silver paint, is satisfactory and simple.

The width of the conductive strips is a function of the size of the model. In a well model as large as an ordinary room, three or four conductors per longitudinal inch would be satisfactory. On the other hand, in a small model, say one in which the trough representing the well bore is only ¼ inch wide, it may be necessary to have as many as eighty conductors per longitudinal inch. In any case, the width of the conductive strips should be substantially greater than the insulating gaps which separate them.

We claim:

1. In a potentiometric model, the combination which comprises pools of electrolyte, an impervious wall of insulating material disposed between the pools in contact therewith and means for transmitting electrical currents transversely of the wall but incapable of transmitting currents lengthwise of the wall, said means comprising a large plurality of conductors in contact with the pools and occupying a substantial proportion of both sides of the wall and passing over the wall, but separated from each other by relatively narrow insulating spaces, each not more than about .01 inch thick, the area of the wall covered by the conductors being several times the area of the insulating space between conductors, and there being several individual conductors per linear inch lengthwise of the wall, and a layer of insulating grease on the wall above the portion of the wall immersed in electrolyte to prevent creep of the electrolyte up the wall.

2. In a potentiometric model, the combination which comprises two pools of electrolye, an impervious wall of insulating material disposed between the pools of electrolyte in contact therewith, and a plurality of spaced conductors mounted on and extending transversely of the wall to contact both of the pools of electrolyte, with the area of the wall which is covered by the conductors being several times the total area of the spaces between the conductors to provide a barrier wall which is substantially electrically invisible so that it does not appreciably distort the current flow lines and the equipotential lines in the neighborhood of the barrier wall.

3. In a potentiometric model, the combination which comprises two pools of electrolyte, an impervious wall of insulating material disposed between the pools of electrolyte in contact therewith, and a plurality of spaced conductors mounted on the wall and extending over the wall so that the conductors occupy both sides of the wall and contact both of the pools of electrolyte, with the area of the wall which is covered by the conductors being at least five and less than thirty-two times the total area of the spaces between the conductors to provide a barrier wall which is substantially electrically invisible so that it does not appreciably distort the current flow lines and the equipotential lines in the neighborhood of the barrier wall.

References Cited in the file of this patent

UNITED STATES PATENTS

| 522,839 | Knofler | July 10, 1894 |
| 1,070,454 | Griswold | Aug. 19, 1913 |
| 1,209,710 | Huth | Dec. 26, 1916 |
| 1,281,983 | Liebknecht | Oct. 15, 1918 |
| 1,727,094 | Baylis | Sept. 3, 1929 |
| 1,910,021 | Legg | May 23, 1933 |
| 2,151,686 | Briefer | Mar. 28, 1939 |
| 2,547,950 | Lee et al. | Apr. 10, 1951 |